United States Patent
Büttner et al.

(10) Patent No.: US 10,819,198 B2
(45) Date of Patent: Oct. 27, 2020

(54) METHOD FOR PRODUCING A SQUIRREL-CAGE ROTOR FOR AN ASYNCHRONOUS MACHINE

(71) Applicant: SIEMENS AKTIENGESELLSCHAFT, Munich (DE)

(72) Inventors: Klaus Büttner, Hollstadt (DE); Klaus Kirchner, Ostheim (DE); Matthias Warmuth, Windshausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/607,607

(22) PCT Filed: Apr. 16, 2018

(86) PCT No.: PCT/EP2018/059623
§ 371 (c)(1),
(2) Date: Oct. 23, 2019

(87) PCT Pub. No.: WO2018/206230
PCT Pub. Date: Nov. 15, 2018

(65) Prior Publication Data
US 2020/0083786 A1 Mar. 12, 2020

(30) Foreign Application Priority Data
May 9, 2017 (EP) .................................... 17170213

(51) Int. Cl.
*H02K 15/00* (2006.01)
*B21D 22/02* (2006.01)
*H02K 17/16* (2006.01)

(52) U.S. Cl.
CPC ....... *H02K 15/0012* (2013.01); *B21D 22/022* (2013.01); *H02K 17/165* (2013.01)

(58) Field of Classification Search
CPC ............. H02K 15/0012; H02K 17/165; B21D 22/022
See application file for complete search history.

(56) References Cited

U.S. PATENT DOCUMENTS 6,088,906 A * 7/2000 Hsu .................... H02K 15/0012
310/211
6,876,119 B2 * 4/2005 Sasaki .................... H02K 1/276
310/156.53
(Continued)

FOREIGN PATENT DOCUMENTS

DE 34 13 519 C2 6/1986

OTHER PUBLICATIONS

PCT International Search Report and Written Opinion of International Searching Authority dated May 7, 2018 corresponding to PCT International Application No. PCT/EP2018/059623 filed Apr. 16, 2018.

*Primary Examiner* — Naishadh N Desai
(74) *Attorney, Agent, or Firm* — Henry M. Feiereisen LLC

(57) ABSTRACT

In a method for producing a squirrel-cage rotor for an asynchronous machine, conductor rods made from a first conductive material are inserted in substantially axial grooves of a laminated rotor core in such a manner that the conductor rods protrude from an end face of the laminated rotor core. A short circuit ring disc made from a second conductive material and heated above the recrystallization temperature is axially pressed onto the protruding conductor rods on the end face of the laminated rotor core, taking into account a temperature range, a deformation, and the rate of deformation of the short circuit ring, with a permissible shear stress of the first and second conductive materials (Continued)

being locally exceeded and material transitions being caused by diffusion at an interface between the conductor rods and the short circuit ring, thereby resulting in microwelding. Subsequently or simultaneously the short circuit ring disc is hot shaped.

16 Claims, 6 Drawing Sheets

(56) References Cited

U.S. PATENT DOCUMENTS

| | | | | |
|---|---|---|---|---|
| 2012/0133236 A1* | 5/2012 | Buttner | ............... | B22D 19/0054 310/211 |
| 2012/0187796 A1* | 7/2012 | Buttner | ............... | B22D 19/0054 310/211 |
| 2013/0291373 A1* | 11/2013 | Meyer | ................ | H02K 15/0012 29/598 |
| 2015/0349616 A1* | 12/2015 | Buttner | ................ | H02K 17/165 310/211 |
| 2016/0141944 A1* | 5/2016 | Berger | ................ | H02K 17/165 310/211 |

* cited by examiner

METHOD FOR PRODUCING A SQUIRREL-CAGE ROTOR FOR AN ASYNCHRONOUS MACHINE

CROSS-REFERENCES TO RELATED APPLICATIONS

This application is the U.S. National Stage of International Application No. PCT/EP2018/059623, filed Apr. 16, 2018, which designated the United States and has been published as International Publication No. WO 2018/206230 A1 and which claims the priority of European Patent Application, Serial No. 17170213.7, filed May 9, 2017, pursuant to 35 U.S.C. 119(a)-(d).

BACKGROUND OF THE INVENTION

The invention relates to a method for producing a squirrel-cage rotor for an asynchronous machine, as well as the asynchronous machine itself and the use thereof in different, preferably industrial applications.

Squirrel-cage rotors of dynamoelectric rotary machines are produced in the lower power range by die casting technology in one operation. This integral method is cost intensive as the die-casting molds are expensive and wear out comparatively quickly. Furthermore, there is a comparatively high degree of variation in the production quality of a squirrel-cage rotor produced in this way. This manifests itself, for example, in the change in the quality of the melt in the crucible, through contamination of the melt during the casting process, through release agent or abrasion on the tool, as well as through shrinking or stress cracking upon cooling of the die-cast.

In the higher power range or in special applications of dynamoelectric rotary machines, individual conductor rods are electrically and mechanically connected to a short circuit ring. This is done, for example, by soldering or welding processes, as can be seen from DE 34 13 519 C2.

However, it is disadvantageous that in these larger dynamoelectric machines short-circuit rings are present which have a circulating soldering trough which has to be completely filled with solder during the soldering process. In this case, only the volume of the volume of rotor rods projecting in the soldering trough is not filled with solder. On account of the high silver content in the solder, inter alia, production of the soldered connection between the rotor rods and the short-circuiting ring is not particularly economically viable.

In order to eliminate the quality losses that occur even at low power ranges, the die-casting process is carried out, for example, under the influence of protective gas. Likewise, tools with multiple venting options are provided, or even a re-alloying of the melt is performed. These interventions make it possible to increase the efficiency of the asynchronous cage rotor, but additional measures are required for strength, which in particular include a high speed capability, such as, for example, support rings or the use of alloys in order to obtain higher strength values.

Based on this, the object of the invention is to provide a method for producing a squirrel-cage rotor for an asynchronous machine, wherein both the electrical properties and the economical manner of the production method are paramount. Furthermore, a more powerful connection of rotor rods and short circuit rings should be simple and effective to produce.

SUMMARY OF THE INVENTION

This object is achieved by a method for producing a squirrel-cage rotor for an asynchronous machine comprising the following steps:
  providing a laminated rotor core having essentially axially running grooves,
  inserting into the grooves conductor rods made from a first conductive material in such a manner that the conductor rods protrude from the end faces of the laminated rotor core,
  providing a short circuit ring disc made from a second conductive material which is heated above the recrystallization temperature,
  axially pressing at least one short circuit ring disc on the end face of the laminated rotor core with protruding conductor rods taking into account the temperature range, the deformation, and the rate of deformation,
  subsequently or simultaneously hot shaping of the short circuit ring disc which has been axially pressed on.

This object is likewise achieved by an asynchronous machine with a squirrel-cage rotor made according to one of the methods according to the invention.

This object is likewise achieved by asynchronous machines which in the case of compressors, conveyor drives or vehicle drives are provided with at least one asynchronous machine, which are provided with a short-circuit cage which was made according to the inventive method.

According to the invention, instead of the known die-casting method, a short circuit cage, i.e. a connection of the conductor rods to short circuit ring discs, is now produced in a combination of microwelding and hot shaping.

In this process, the individual rotor laminations are first stacked or punched to form a finished rotor core. A first conductive material, for example, drawn copper rods, is inserted into the existing grooves of the rotor, irrespective of whether a groove bevel is present or not. These conductor rods project from the end faces of the laminated rotor core. In order to fix the conductor rods precisely in position in the rotor core and for the subsequent connection process with the short circuit discs without imbalances occurring in the rotor, they are held in position by a corresponding holding device, be it a matrix etc. The ends of the conductor rods projecting from the laminated core are connected in an electrically conductive manner to the short circuit disc, which is preferably made of aluminum or an aluminum alloy, and the short circuit rings of this squirrel-cage rotor thus created.

This connection takes place by axial pressing of the short circuit ring disc onto the conductor rods or of the conductor rods onto the short circuit ring disc or mutual axial pressing on, wherein the conductor rod/conductor rods and short circuit ring disc move towards each another. The conductor rods project on the respective end face of the laminated rotor core.

This axial pressing takes place taking into consideration the ideal temperature range for deformation and the optimum rate of deformation. Plastic deformation takes place as a result of the displacement migration of the atomic planes in the lattice. This migration and thus the overcoming of obstacles in the atomic lattice (such as, for example, step dislocations, foreign atoms, etc.) is favored by an increase in temperature. Thus, starting from a certain, material-dependent temperature limit, the deformability increases. The rate of deformation, the temperature and the yield stress of the respective material are thus to be matched to one another.

A microweld is formed between the material of the short circuit ring disc and the conductor rods. This microweld is produced by virtue of the fact that the conductor rod and the short circuit ring rub firmly on one another and thus generate surface pressure and additional frictional heat. In this case, the permissible shear stresses of these materials are locally exceeded and material transitions are caused by diffusion at the interface between the conductor rod and the short circuit ring. The consequence of this are welds in the micro range as well as microwelds.

The short circuit ring disc need not necessarily be designed as a hollow cylindrical shape when viewed geometrically. Only in the region of the conductor rods is so much material to be provided that sufficient contacting and fixing of the conductor rods takes place in the short circuit ring, so that a high-efficiency short circuit cage of the rotor is produced.

The short circuit ring disc/short circuit ring is heated above the recrystallization temperature of its material, whereby hot shaping with a relatively low application of force is possible.

Reshaping results in a strained lattice. The material solidifies. At high temperature, recovery and recrystallization processes take place in the material. The concomitant change in the dislocation arrangement again leads to the softening of the material. However, this process requires time which is reduced as the rate of deformation increases.

This means that with an increasing rate of deformation, less and less time is available for recovery and recrystallization processes. Thus, during hot shaping, a rate-dependent yield stress is present in the material.

Thus, the degree of deformation, rate of deformation, temperature and yield stress are to be coordinated with one another depending on the material used for the deformation process according to the invention. However, the yield stress must not be too high.

The desired temperature for pure Al 99.7 is in the temperature range of 350 to 400° C. For the so-called Al wrought alloys, these temperatures are in the range of 400 to 500° C. on account of the alloy components. As a result of the axial pressing force of the short circuit ring disc onto the conductor rods, the conductor rods now sink in the "pasty" mass of the short circuit ring discs. During this joining process, the aforementioned microweld is produced in the contact surfaces between the conductor rods and the short circuit ring discs. At the same time, the short circuit ring is formed by hot shaping in accordance with the predetermined tool contour which holds the short circuit ring. In this case, the tool contour can be heated over a predetermined temperature range.

At the same time, by applying the axial joining force, the stacked laminated core is compacted and solidified in the axial direction. After completion of the joining process described above, the laminated rotor core remains in the stressed state as the rods with the short circuit ring discs are firmly bonded to the end faces of the laminated rotor core. An additional form fit is therefore not necessary.

In general, the wrought alloys are material compositions that exhibit high ductility (plastic deformability) and are thus ideally suited for hot shaping, i.e. high degrees of deformation are possible with comparatively little effort.

Copper rods of oxygen-free drawn electro-copper having a conductivity of approx. 58 MS/m are preferably used as conductor rods. These conductor rods are preferably in a medium-hard to hard state (60 HB to 85 HB, wherein HB stands for Härte Brinell (Brinell hardness)) in order to avoid deformation or even buckling of the conductor rods under the axial joining force of the short circuit ring discs. This results in the compressive strength of the conductor rod having to be greater than the yield stress during the joining process. This hardness range corresponds to a tensile strength of approx. 300 to 400 N/mm$^2$.

Al wrought alloys are preferably chosen as short circuit ring discs as these are ideally suited for hot shaping as the force required for deformation is relatively low with relatively high deformability. Thus, for example, the materials EN AW 6082 or else EN AW 6060 are used. These materials EN AW 6082 or else EN AW 6060 are in particular in a soft material state according to DIN EN 516 e.g. T4. In this state, the highest degrees of deformation are possible. T4 describes a relatively soft state which is achieved by solution annealing with cold aging.

These short circuit ring discs are obtained from an extruded cylinder. These discs are adjustable in their axial width, this is achieved by the position of the separation on the cylinder.

For operationally reliable joining, the following parameters such as temperature and joining speed and thus also the rate of deformation are to be adjusted according to the materials to be coupled to one another, for example, copper, aluminum or other materials. This means, depending on which material combination is chosen, the abovementioned values are different. If, for example, an Al alloy disc, that is to say a short circuit ring disc made of an Al wrought alloy, is used, the temperatures are in the range of 500° C. In the case of a copper alloy, these temperatures are approx. 800° C. The rate of deformation and thus the speed with which the short circuit ring disc is pressed on will also be different in the case of different materials.

Guide values for Al alloys of the short circuit ring discs are a temperature range of approx. 400 to 500° C., a deformation in the range of 0.5 and a rate of deformation of 1 to 4 1/s.

In order to increase the efficiency and speed capability of the squirrel-cage rotor produced, a simultaneous and/or downstream heat treatment can be used. By means of this downstream heat treatment, the so-called tempering, mechanical and electrical material properties such as tensile strength and electrical conductivity can be increased. The strength increases by virtue of the fact that finely divided precipitates form as a result of the tempering. This aging preferably takes place at moderate temperatures of approximately 140 to 190° C., which is also referred to as artificial aging.

As a result, for example, tensile strength and electrical conductivity of the individual components, but also of the entire cage of the squirrel-cage rotor, can be positively influenced. Thus, in the case of the material EN AW 6060, the yield strength is increased from 80 N/mm$^2$ to approx. 200 N/mm$^2$ by 10 hours of tempering at 185° C. The electrical conductivity of the short circuit ring can also be increased from 28 MS/m to 34 MS/m as a reduction of the stresses in the lattice occurs during the heat treatment.

This heat treatment is carried out, for example, by solution annealing with subsequent quenching. As a result, the stress in the lattice is reduced and "frozen". The lower the lattice is braced, the better the electrical conductivity.

The yield strength of the short circuit ring thus obtained is higher by a factor of 10 than the yield strength in the case of pressure-cast short circuit rings with Al 99.6. As a result, higher rotational speeds of the rotor of the ASM are possible, for example, without additional supports on the short circuit ring.

If a ductile material is loaded below the yield strength (also referred to as Rp 0.2 yield strength), the latter is again returned to its original state after being relieved of pressure. Higher loads result in plastic deformation. The centrifugal force acts on the short circuit ring when a rotor is acted upon at high rotational speed. The higher the yield strength, the more certainty with respect to plastic deformation of the short circuit ring.

As a result of targeted heat treatment, the higher value of the yield strength compared to pure aluminum can be further increased.

Thus, for example, the yield strength of Al 99.6 is approx. 20 N/mm$^2$, while the yield strength of AlMgSi (EN AW 6060) after a heat treatment is approx. 200 N/mm$^2$.

Further embodiments of the invention are, for example, a short circuit ring disc provided with a closed outer radial contour made of steel or another material having a high tensile strength or yield strength in order to achieve even higher speeds with an ASM.

Advantageously, the short circuit ring disc has prefabricated recesses for the rods, which is simple to produce in extrusion technology. In this case, the geometric cross-section of the recesses provided is slightly smaller than the geometric rod cross-section of a conductor rod in order to obtain an excess and thus a microweld between the conductor rod and the short circuit ring disc.

As a result of this measure, the degree of deformation and the joining force can be reduced as the displacement of the material is reduced.

The copper rods are advantageously beveled at the ends in order to obtain better centering and reduction of the joining force.

As a result of different angles at the bevel in the radial plane, during the joining of the short circuit disc it is possible for the rods to be ideally pressed uniformly against the groove base of the laminated core of the rotor. A greater or steeper angle must be chosen on the outside than on the inside.

One or more additional balancing discs can be integrated in a form-fitting manner with the process. It is also possible to form vanes for circulating the air inside an engine as almost any desired embodiments on the short circuit ring.

The advantages of this method of production are now that impurities in the conductor rod as well as in the short circuit ring are avoided. There are no voids inherent in the process which can occur as a result of a casting process. Furthermore, an electrically secure link occurs between the conductor rod and the short circuit ring due to microwelding over the entire surface.

The short circuit ring made of aluminum has a lower moment of inertia and thus a higher rotational speed capability due to its lower mass in relation to copper short circuit rings.

BRIEF DESCRIPTION OF THE DRAWING

The invention and advantageous embodiments of the invention are explained in more detail with reference to exemplary embodiments shown in principle. The diagrams show.

DETAILED DESCRIPTION OF PREFERRED EMBODIMENTS

Figure 1:
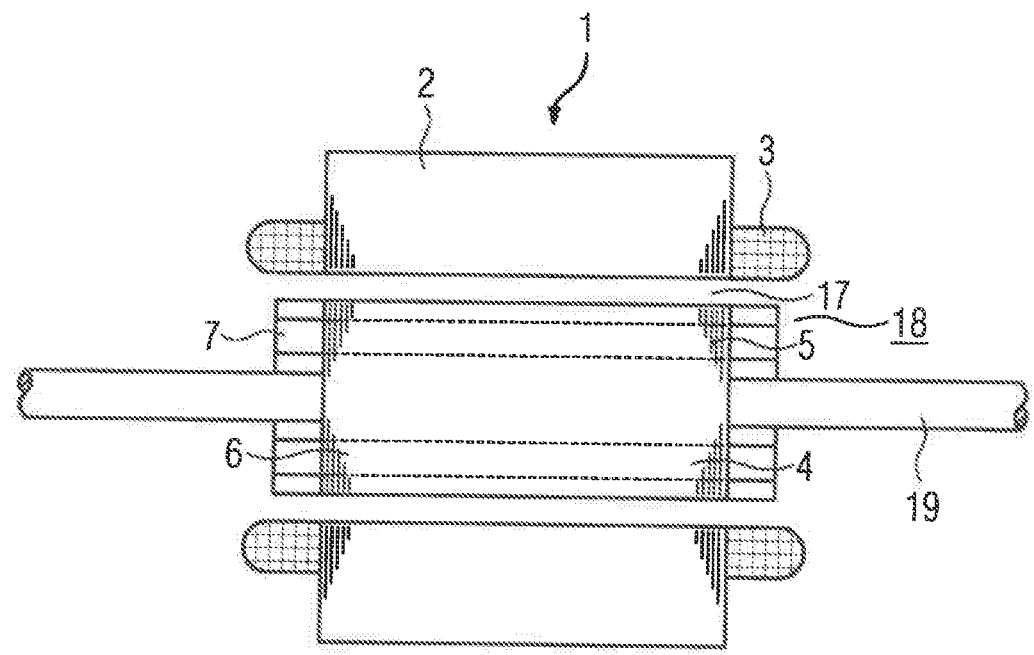
FIG. 1 a basic longitudinal section of an asynchronous machine.

FIG. 1 shows a basic longitudinal section of an asynchronous machine 1 with a stator 2, which at its end faces forms a winding system 3 which forms winding heads there. The winding system 3 can be constructed, for example, from expanded coils, form coils, toothed coils of different or the same coil width.

A rotor 18 is arranged at a distance from the stator 2 over an air gap 17 of this asynchronous machine 1. The rotor 18, which inter alia, has a laminated rotor core 5, has at least one short circuit ring, in particular, a short circuit ring disc 7 in the region of the end faces 15 of the laminated rotor core 5. The short circuit ring, in particular, the short circuit ring disc 7, connects and contacts conductor rods 6 which are arranged in grooves 14 of the laminated rotor core 5 not shown in more detail.

The short circuit ring, in particular, the short circuit ring disc 7, as shown in FIG. 1, is in contact with a shaft 19, which brings about a thermal connection and thus a cooling of the short circuit ring during operation of the asynchronous machine 1.

Likewise, however, a spacing of the short circuit ring, in particular, of the short circuit ring disc 7 from the shaft 19 is possible.

Spacing of the short circuit ring, in particular, a short circuit ring disc 7, is thus possible from the end face 15 of the laminated rotor core 5 and/or the shaft 19. It is also conceivable that the short circuit ring, in particular, the short circuit ring disc 7, is in contact with the end face 15 of the laminated rotor core 5 and the shaft 19, i.e. in each case.

By means of electromagnetic interaction between the energized stator 2 and a short circuit cage of the rotor 18 which is formed by the conductor rods 6 and the short circuit ring discs 7, a rotation of the shaft 19 occurs.

Figure 2:
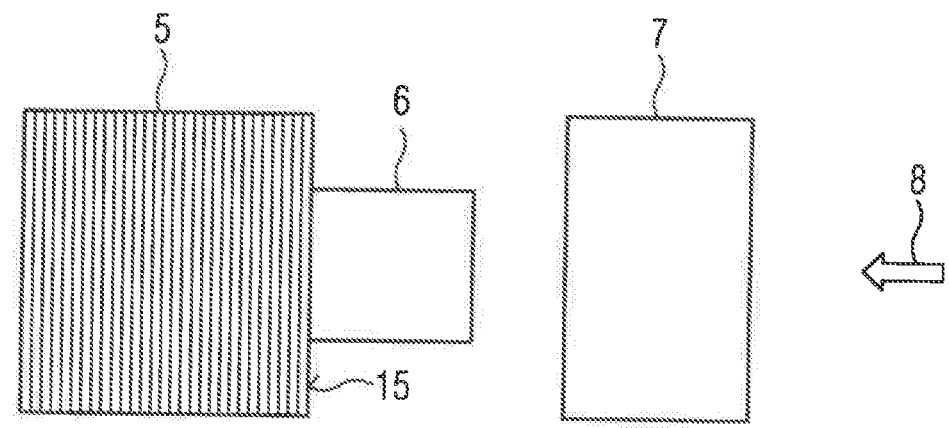
FIGS. 2 to 7 basic forms of representation of the method of production.

FIG. 2 shows, in a basic detailed representation, the laminated rotor core 5, from which a conductor rod 6 projects by way of example and on which a short circuit ring disc 7 is pressed by an axial joining force 8. This axial joining 8 is preferably carried out simultaneously for all conductor rods 6 projecting from an end face 15 of the laminated rotor core 5.

Figure 3:
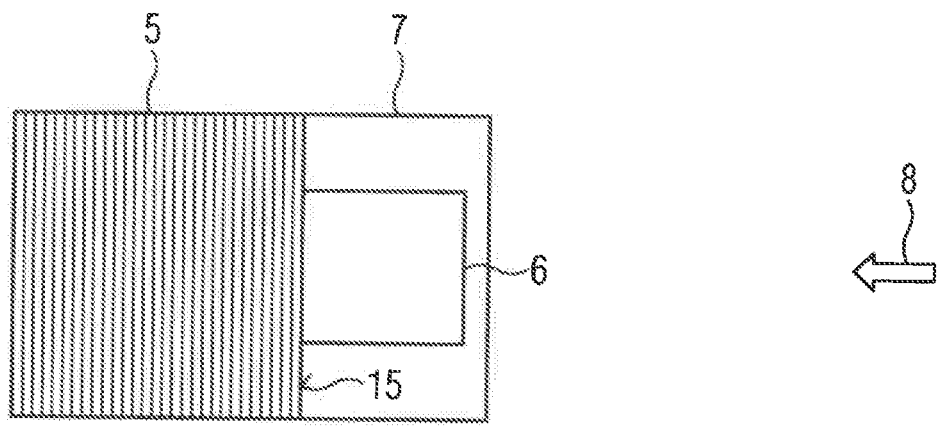

FIG. 3 shows how the short circuit ring disc 7 has been pressed out of the conductor rod 6 projecting from the laminated rotor core 5 and is now electrically contacted and fixed there by means of microwelding. The short circuit ring disc 7 now directly abuts the laminated rotor core 5.

Figure 4:
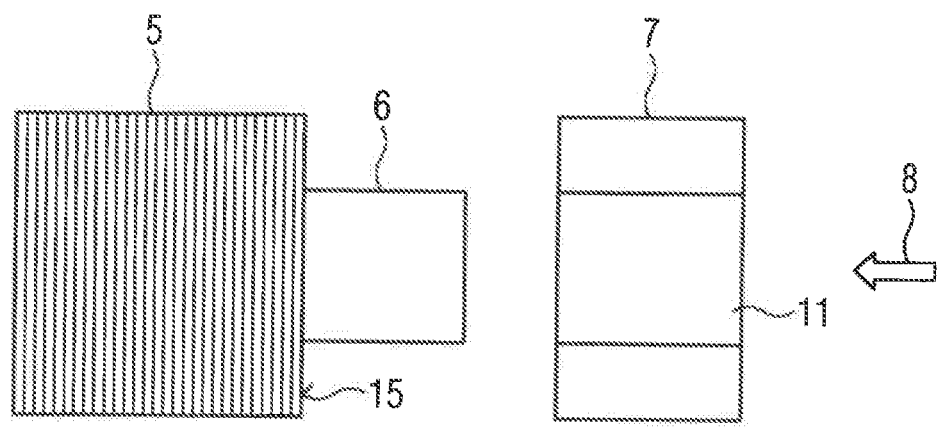

In a further embodiment of the invention, FIG. 4 shows that the short circuit ring disc 7 has recesses 11 which have an undersize with respect to the geometric cross-section of the conductor rod 6 so that an adequate microweld can occur between the conductor rod 6 and the short circuit ring disc 7. It is decisive, inter alia, that the permissible shear stresses of the materials of the short circuit ring disc 7 and the conductor rod 6 are locally exceeded, thus leading to material transitions as a result of diffusion at the interface between the conductor rod 6 and the short circuit ring disc 7.

Figure 5:
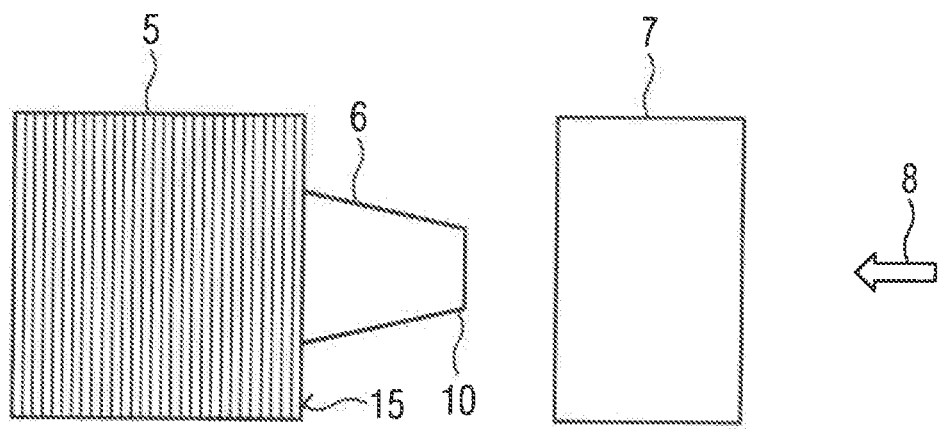

In order to simplify the joining process, according to FIG. 5 the conductor rods 6 are conically shaped or tapered at their conductor rod ends projecting from the laminated rotor core 5 in order to facilitate the joining process. This chamfering is advantageous in all types of production.

Figure 6:
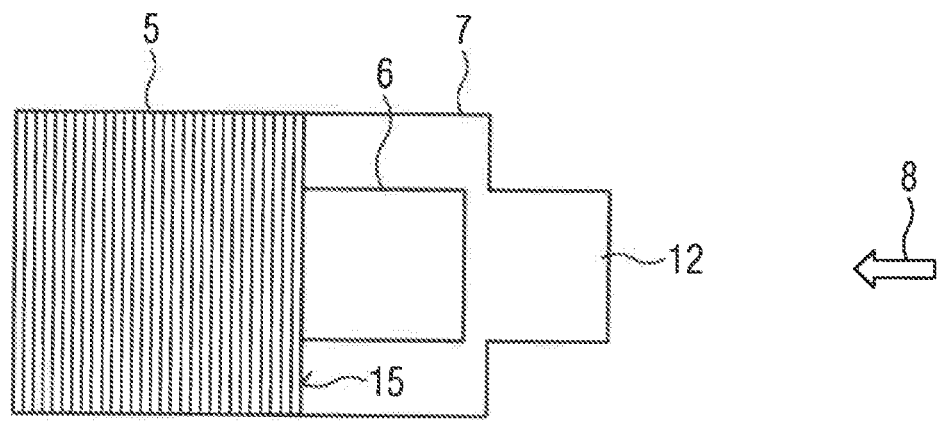

In principle, FIG. 6 shows a joining process according to FIGS. 2 and 3, wherein as a result of the joining process an excess of material 21 can be produced on the short circuit ring disc 7 as the material is pressed into a free space provided by the tool as a result of the displacement of the material of the conductor rod end.

Figure 7:
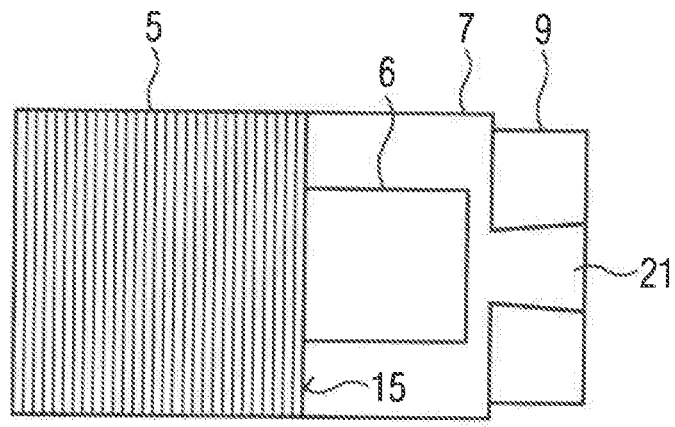

Advantageously, as shown by way of example in FIG. 7, balancing elements 9 but also fan vanes 12 can be formed or preformed by this excess material 21 on the side facing away from the laminated rotor core 5. This is done by pressing the excess material 21 into corresponding predetermined dies of the tool or a device.

It is also possible to arrange additional elements such as fan vanes 12 or balancing elements 9 from another material on the end face of the short circuit ring disc 7 facing away from the laminated rotor core 5 as a result of the excess material 21.

Figure 8:
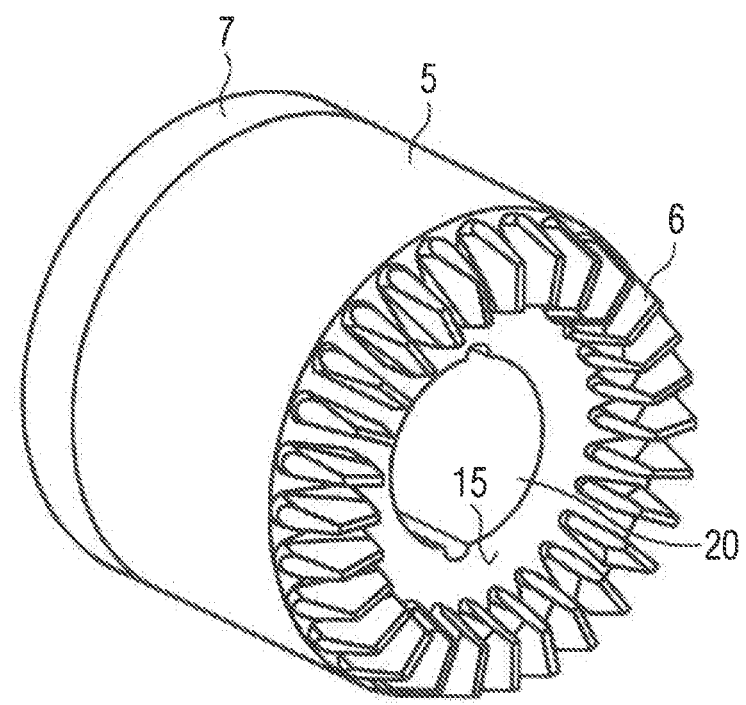
FIG. 8 a perspective view of a squirrel-cage rotor with a short circuit ring on one side, FIG. 9 a perspective view of a longitudinal section through a squirrel-cage rotor with a short circuit ring on one side, FIG. 10 a further embodiment of a squirrel-cage rotor, FIG. 11 an extruded section.

FIG. 8 shows a perspective view of the laminated rotor core 5, on one side of which a short circuit ring disc 7 has already been formed. On the other side of the laminated rotor core 5, the chamfered ends of the conductor rods 6 project out of the laminated rotor core 5 onto which the short circuit ring disc 7 is pressed. Likewise, to see the shaft bore 20 into which the shaft 19 is later shrunk or connected in a torque-proof manner to the laminated rotor core 5 by means of a feather key connection.

However, the shaft 19 can also be connected in a rotationally fixed manner before the axial joining process 7 of the conductor rods 6 to the short circuit ring discs 7 with the laminated rotor core 5.

Figure 9:
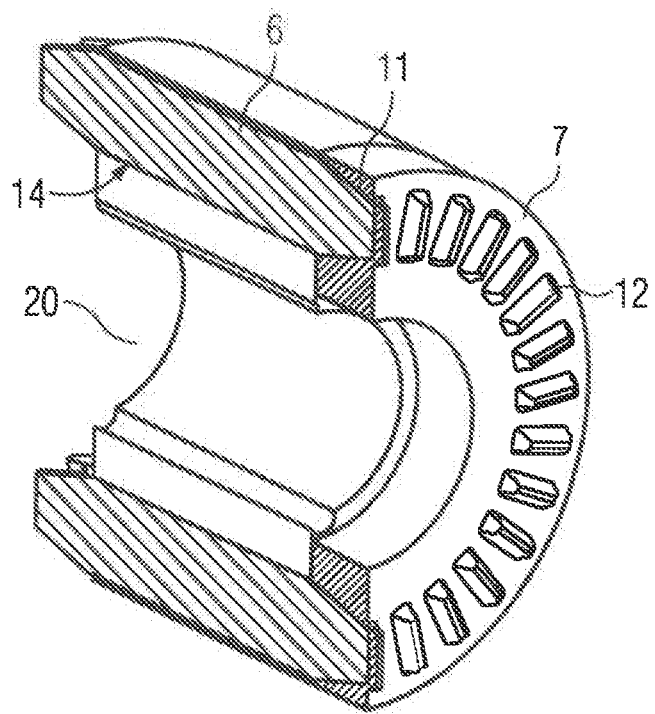

FIG. 9 shows, in a longitudinal section, the laminated rotor core 5, in which a short circuit ring disc 7 has already been pushed axially onto the ends of the conductor rods 6 on one side, wherein in addition to the conical design of the conductor rod 6, a material displacement 21 took place in the short circuit ring disc 7 forming fan-like vanes 12 on the end face of the short circuit ring disc 7.

These fan-like vanes 12 may also be formed by separate elements which are fixed on the end face of the short circuit ring disc 7 by material displacement 21.

Likewise, these fan-like vanes 12 can also be formed by means of an axial passage of the conductor rods 6 through the short circuit ring disc 7.

Figure 10:
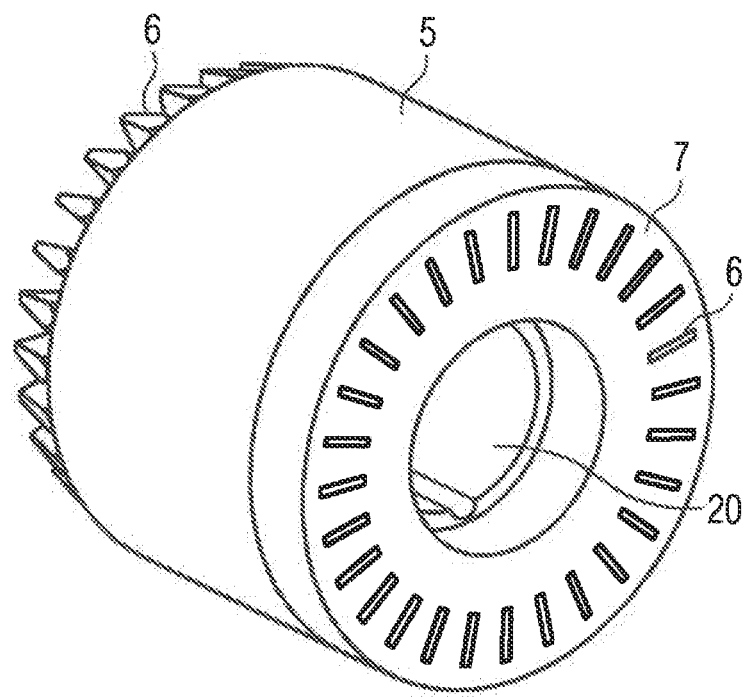

FIG. 10 shows, in a further perspective view, the short circuit ring disc 7 on the laminated rotor core 5, the end face of the short circuit ring disc 7 facing away from the laminated rotor core 5 being planar, in particular parallel to the end face of the laminated rotor core 5. The end faces of the ends of the conductor rods 6 terminate flush with the end face of the short circuit disc 7.

Figure 11:
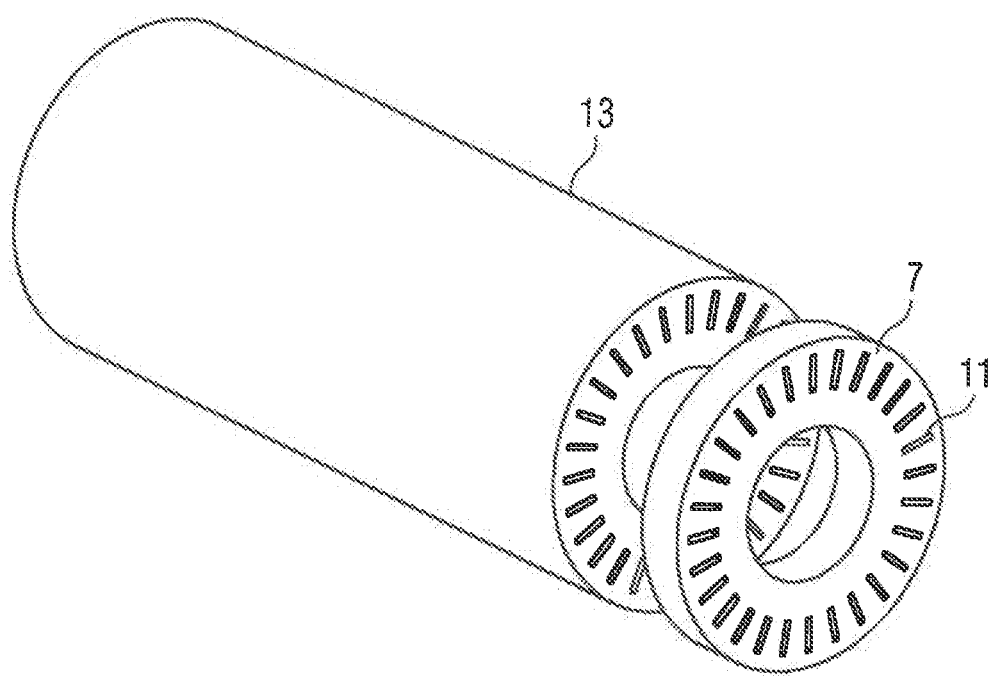

FIG. 11 shows an extruded profile of the material of the short circuit ring, preferably of the aluminum wrought ahoy, which also has corresponding recesses 11, and that, depending on the scope of application and performance of the asynchronous machine 1 (ASM), further short circuit ring discs 7 can be cut off axially.

It is also possible to arrange a plurality of short circuit rings or short circuit ring discs 7 on each end face 15 of the laminated rotor core 5 so as to be insulated from one another. In the rotor 18, short circuit cages which are electrically insulated from one another reduce the harmonics in the air gap 17 of the asynchronous machine 1, in particular if the stator 2 has a winding system 3 with toothed cons, each tooth of the stator 2 being surrounded by a toothed coil.

Such machines have a broad range of applications and are used both for standard and high speed applications in the compressor, fan and pump sectors, in conveyor technology and in automotive technology and are therefore reliable, efficient and simple to produce. Other drive tasks are likewise possible.

What is claimed is:

1. A method for producing a squirrel-cage rotor for an asynchronous machine, said method comprising:
   inserting conductor rods made from a first conductive material into essentially axial grooves of a laminated rotor core in such a manner that the conductor rods protrude from an end face of the laminated rotor core;
   axially pressing a short circuit ring disc made from a second conductive material, which has been heated above a recrystallization temperature, onto the conductor rods on the end face of the laminated rotor core, while taking into account a temperature range, a deformation, and a rate of deformation of the short circuit ring disc, with a permissible shear stress of the first and second conductive materials being locally exceeded and material transitions being caused by diffusion at an interface between the conductor rods and the short circuit ring, thereby resulting in microwelding; and
   subsequently or simultaneously hot shaping the short circuit ring disc,
   wherein the temperature range of the short circuit ring disc is 400 to 500° C.

2. The method of claim 1, wherein the second conductive material is aluminum, copper or an aluminum alloy or copper alloy.

3. The method of claim 1, wherein the conductor rods are beveled.

4. The method of claim 1, further comprising forming recesses in the short circuit ring disc in a region of the conductor rods at a cross-section which substantially corresponds to a cross-section of the conductor rods, said recesses having at least one area which is reduced in cross section to ensure microwelding between the conductor rods and the short circuit ring disc.

5. The method of claim 1, wherein at least one of the conductor rods is made of drawn electro-copper with a conductance of at least 58 MS/m.

6. The method of claim 1, wherein the first conductive material has a compressive strength which is greater than a yield stress in the second conductive material as the short circuit ring disc and the conductor rod are joined.

7. The method of claim 1, further comprising simultaneously or subsequently heat treating the squirrel-cage rotor to increase a yield strength of the short circuit ring disc.

8. The method of claim 1, further comprising forming the short circuit ring disc by separating a disc from an extruded part.

9. An asynchronous machine, comprising a squirrel-cage rotor, said squirrel-cage rotor comprising:
   a laminated rotor core having essentially axial grooves;
   conductor rods made from a first conductive material and inserted into the essentially axial grooves of the laminated rotor core in such a manner that the conductor rods protrude from an end face of the laminated rotor core; and
   a short circuit ring disc made from a second conductive material and axially pressed onto the conductor rods on the end face of the laminated rotor core, while taking into account a temperature range, a deformation, and a rate of deformation of the short circuit ring disc, with a permissible shear stress of the first and second conductive materials being locally exceeded and material transitions being caused by diffusion at an interface between the conductor rods and the short circuit ring, thereby resulting in microwelding, wherein the temperature range of the short circuit rings disc is 400 to 500° C.

10. The asynchronous machine of claim 9, wherein the second conductive material is aluminum, copper or an aluminum alloy or copper alloy.

11. The asynchronous machine of claim 9, wherein the conductor rods are beveled.

12. The asynchronous machine of claim 9, wherein the short circuit ring disc has recesses in a region of the conductor rods at a cross-section which substantially corresponds to a cross-section of the conductor rods, said recesses having at least one area which is reduced in cross section to ensure microwelding between the conductor rods and the short circuit ring disc.

13. The asynchronous machine of claim 9, wherein at least one of the conductor rods is made of drawn electro-dapper with a conductance of at least 58 MS/m.

14. The asynchronous machine of claim 9, wherein the first conductive material has a compressive strength which is greater than a yield stress in the second conductive material as the short circuit ring disc and the conductor rod are joined.

15. A drive system, comprising an asynchronous machine, said asynchronous machine comprising a squirrel-cage rotor including a laminated rotor core having essentially axial grooves, conductor rods made from a first conductive material and inserted into the essentially axial grooves of the laminated rotor core in such a manner that the conductor rods protrude from an end face of the laminated rotor core, and a short circuit ring disc made from a second conductive material and axially pressed onto the conductor rods on the end face of the laminated rotor core, while taking into account a temperature range, a deformation, and a rate of deformation of the short circuit ring disc, with a permissible shear stress of the first and second conductive materials being locally exceeded and material transitions being caused by diffusion at an interface between the conductor rods and the short circuit ring, thereby resulting in microwelding, wherein the temperature range of the short circuit ring disc is 400 to 500° C.

16. The drive system of claim 15, constructed for use in a compressor, conveyor drive, or vehicle drive.

* * * * *